United States Patent
Shi et al.

(10) Patent No.: US 8,481,202 B2
(45) Date of Patent: Jul. 9, 2013

(54) BATTERY COVER ASSEMBLY

(75) Inventors: Zheng Shi, Shenzhen (CN);
Chih-Chiang Chang, Taipei Hsien (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 1137 days.

(21) Appl. No.: 12/403,517

(22) Filed: Mar. 13, 2009

(65) Prior Publication Data

US 2009/0263713 A1 Oct. 22, 2009

(30) Foreign Application Priority Data

Apr. 18, 2008 (CH) .......................... 2008 1 0301187

(51) Int. Cl.
*H01M 2/02* (2006.01)
(52) U.S. Cl.
USPC ............ 429/177; 429/151; 429/163; 429/100
(58) Field of Classification Search
USPC .................. 429/100, 151, 163, 177; 455/347, 455/575.1
See application file for complete search history.

(56) References Cited

U.S. PATENT DOCUMENTS

2007/0218961 A1* 9/2007 Luo et al. .................. 455/575.1
2008/0193837 A1* 8/2008 Lu .................................. 429/163

\* cited by examiner

*Primary Examiner* — Ula C Ruddock
*Assistant Examiner* — Frank Chernow
(74) *Attorney, Agent, or Firm* — Altis Law Group, Inc.

(57) ABSTRACT

A battery cover assembly includes a back cover, a battery cover and at least one elastic device. The back cover includes a battery chamber recessed there-into and an separation-preventing portion protruding therefrom. The battery cover is slidably mounted on the battery chamber of the back cover and includes an anti-detaching portion protruding therefrom. The anti-detaching portion is configured for being blocked by the separation-preventing portion to avoid the battery cover being released from the back cover when the battery cover is slid relative to the back cover. The elastic device has two opposite ends secured to the back cover and the battery cover respectively. The elastic device is configured for providing an elastic force to open the battery cover relative to the back cover.

8 Claims, 5 Drawing Sheets

BATTERY COVER ASSEMBLY

BACKGROUND

1. Technical Field

The disclosure generally relates to cover structures, and particularly to a battery cover assembly for use in a portable electronic device.

2. Discussion of the Related Art

With the development of wireless communication and information processing technologies, portable electronic devices such as mobile phones and personal digital assistants (PDAs) are now in widespread use, and consumers may now enjoy the full convenience of high technology products almost anytime and anywhere.

Batteries are widely used in these portable electronic devices and a battery cover assembly is typically used to secure the battery within the portable electronic device. However, existing battery cover assemblies are hard to disassemble or install and tend to be damaged as a result. Also, people may lose the battery cover when they remove it to replace batteries.

Therefore, there is room for improvement within the art.

BRIEF DESCRIPTION OF THE DRAWINGS

Many aspects of the exemplary battery cover assembly can be better understood with reference to the following drawings. The components in the drawings are not necessarily drawn to scale, the emphasis instead being placed upon clearly illustrating the principles of the exemplary battery cover assembly. Moreover, in the drawings, like reference numerals designate corresponding parts throughout the several views, in which.

DETAILED DESCRIPTION OF THE EMBODIMENT

Figure 1:
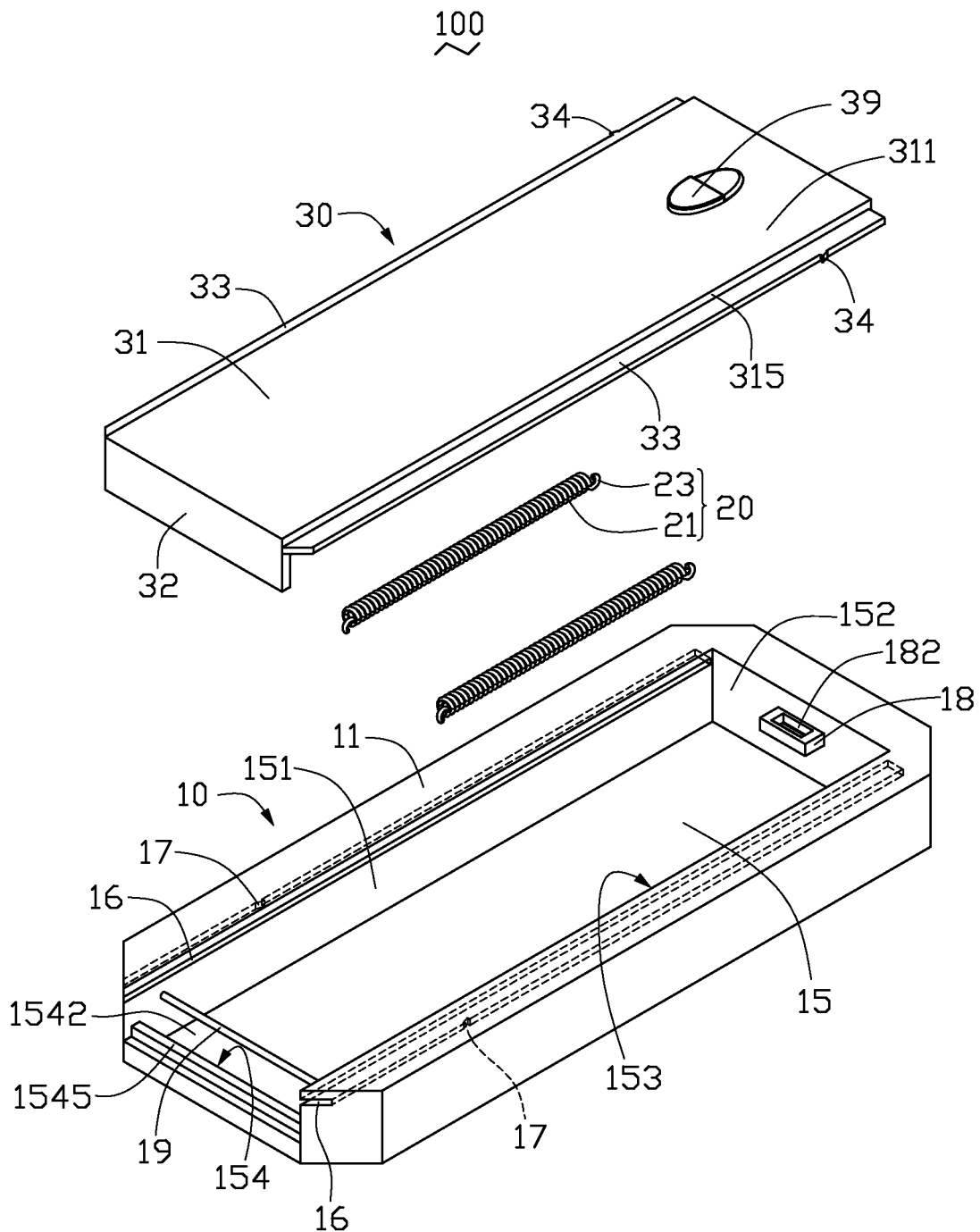
FIG. 1 shows a disassembled schematic, perspective view of a battery cover assembly according to an exemplary embodiment.
Figure 2:
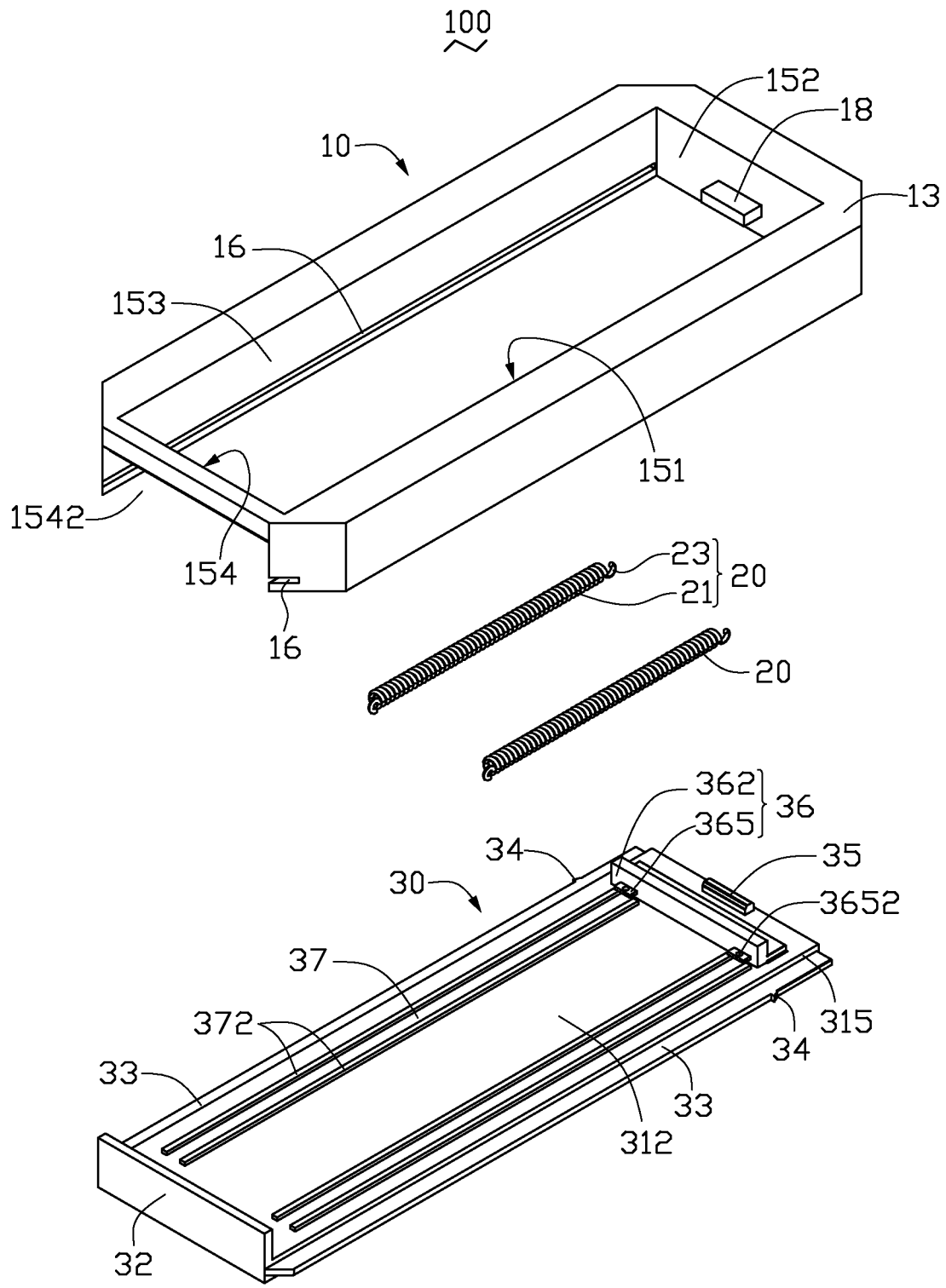
FIG. 2 is similar to FIG. 1, but viewed from another aspect.

FIGS. 1 and 2 show a battery cover assembly 100 for use in a portable electronic device, such as a mobile phone or personal digital assistant. The battery cover assembly 100 includes a back cover 10, two elastic devices 20, and a battery cover 30. The battery cover 30 is slidably mounted on the back cover 10 and the two elastic devices 20 are configured for providing an elastic force to bias the battery cover 30 towards the open position relative to the back cover 10.

The back cover 10 is substantially rectangular and can be a shell or a main body of the portable electronic device. The back cover 10 includes a first surface 11, an opposite second surface 13, a battery chamber 15, two chutes 16, two separation-preventing portions 17, a latch portion 18 and an assembling portion 19. In the exemplary embodiment, the battery chamber 15 is also substantially rectangular and recessed into the back cover 10 from the first surface 11 to the opposite second surface 13. The battery chamber 15 includes a first sidewall 151, a second sidewall 152, a third sidewall 153 parallel to the first sidewall 151 and a fourth sidewall 154 parallel to the second sidewall 152. The first sidewall 151, the second sidewall 152, the third sidewall 153 and the fourth sidewall 154 cooperatively form the rectangular battery chamber 15 to accommodate a battery (not shown). The fourth sidewall 154 defines a rectangular opening 1542 communicating with the first surface 11 and forming a stepped resisting portion 1545 toward the first surface 11.

The two chutes 16 are opposite to each other and recessed in the first sidewall 151 and the third sidewall 153 respectively near and parallel to the first surface 11 for slidably assembling the battery cover 30. The end portions of the two chutes 16 toward the fourth sidewall 154 communicate with the opening portion 1542, to allow slidably assembling the battery cover 30 to the corresponding chutes 16. The two separation-preventing portions 17 are two protrusions protruding from the two chutes 16 respectively near and toward the fourth sidewall 154 end. The latch portion 18 is substantially a rectangular board protruding from the middle portion of the second sidewall 152 toward the fourth sidewall 154. The latch portion 18 includes a latch slot 182 recessed therein toward the first surface 11 side. The assembling portion 19 is disposed between the first sidewall 151 and the third sidewall 153 near the fourth sidewall end 154 of the back cover 10. In the exemplary embodiment, the assembling portion 19 is substantially cylindrical and protrudes from the first sidewall 151 toward the third sidewall 153 and connects with the third sidewall 153.

The two elastic devices 20 are two helical springs. Each spring includes a cylindrical main body 21 and two hook portions 23 disposed at the two ends of the main body 21 respectively. The two hook portions 23 of the spring 20 are assembled to the assembling portion 19 of the back cover 10 and the battery cover 20 respectively.

The battery cover 30 is substantially an L shaped board and slidably mounted on the back cover 10 for covering the battery chamber 15. The battery cover 30 includes a top board 31, a closed board 32, two rails 33, two anti-detaching portions 34, a latch block 35, an installing portion 36, two guiding slots 37, and a pressing portion 39. The top board 31 is substantially a rectangular shaped board and includes an outer surface 311, an opposite inner surface 312 and two parallel sidewalls 315. The closed board 32 is substantially a rectangular shaped board extending from the edge of one end of the top board 31 toward the inner surface 312 and perpendicular to the top board 31. The two rails 33 are two parallel substantially rectangular bars protruding from the two sidewalls 315 respectively parallel to the outer surface 311 of the top board 31.

The two anti-detaching portions 34 are two protrusions protruding from the two rails 33 respectively away from and opposite to the closed board 32 end of the battery cover 30. The two anti-detaching portions 34 correspond to the two separation-preventing portions 17 of the back cover 10 respectively for being blocked by the separation-preventing portions 17 to avoid the battery cover 30 being released from the back cover 10 when the battery cover 30 is slid relative to the back cover 10. The latch block 35 is disposed at the end of the inner surface 312 of the top board 31 opposite to the closed board 32 for latching with the latch portion 18 of the back cover 10. The installing portion 36 is disposed at the end of the inner surface 312 of the top board 31 near the latch block 35 and includes a base 362 and two clamping portions 365. The base 362 is substantially a board protruding from the inner surface 312 of the top board 31 and parallel to the closed board 32. The two clamping portions 365 are two spaced protrusions protruding from the base 362 toward the closed board 32. The two clamping portions 365 each defines a latch hole 3652 therethrough. The two guiding slots 37 are spaced apart and disposed on the inner surface 312 of the top board 31. The two guiding slots 37 are parallel to the two sidewalls 315 and located between the closed board 32 and the installing portion 36. In the exemplary embodiment, each guiding slot 37 is formed with two spaced protrusions 372 protruding from the inner surface 312 of the top board 31 to accommodate the corresponding spring 20. The distance between the protrusions 372 is enough to accommodate the corresponding spring 20. The pressing portion 39 protrudes from the outer surface 311 of the top board 31 and opposite to the closed board 32.

Figure 3:
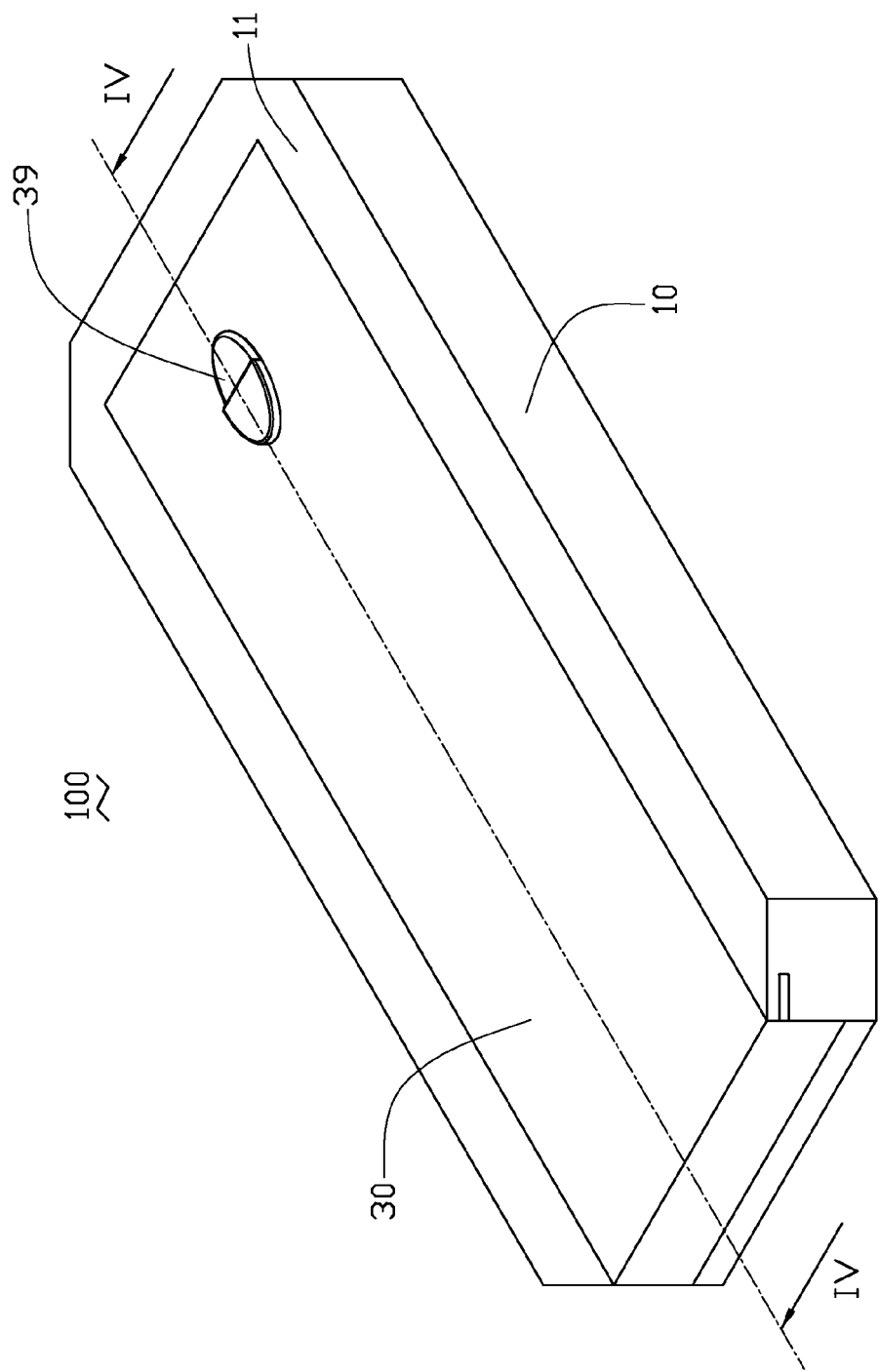
FIG. 3 is an assembled schematic, perspective view of a battery cover assembly according to an exemplary embodiment.
Figure 4:
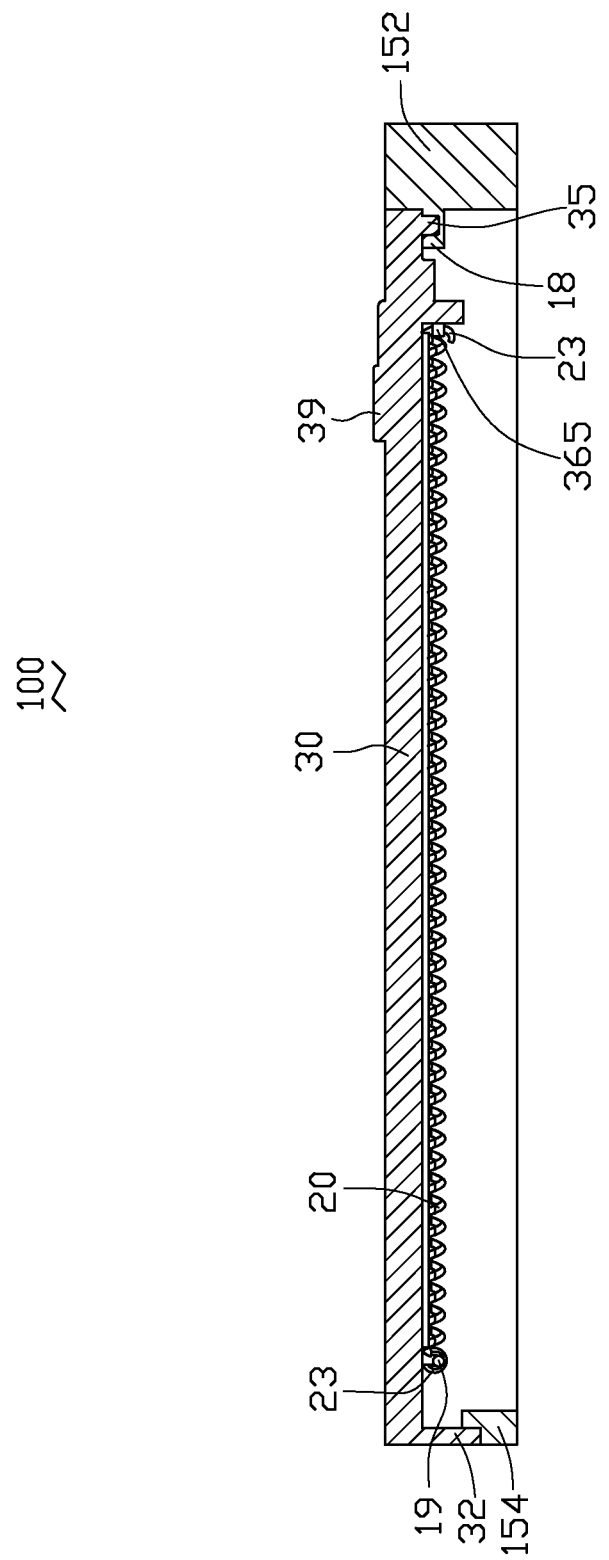
FIG. 4 is a cut-away view of the battery cover assembly along line IV-IV of FIG. 3.
Figure 5:
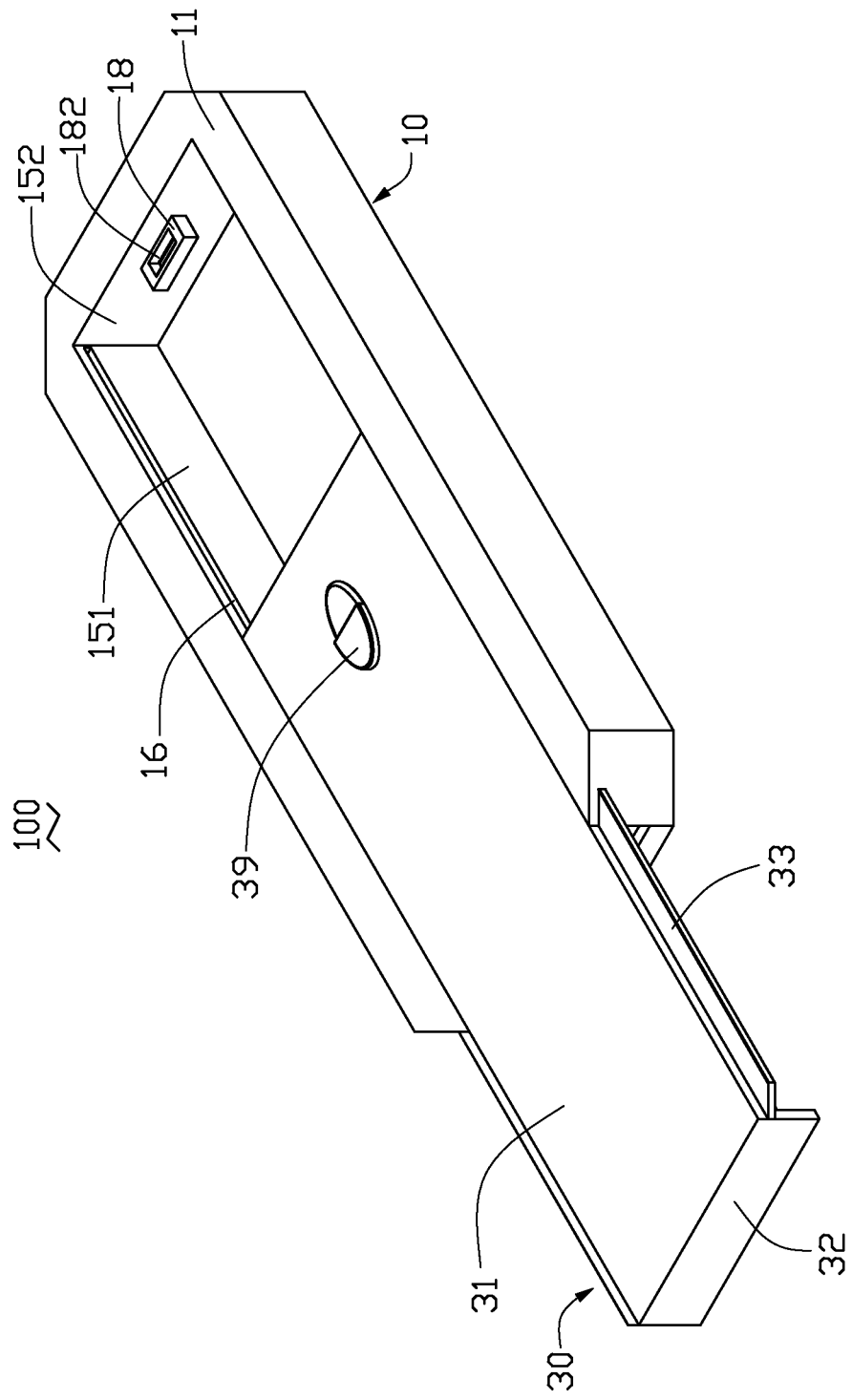
FIG. 5 is similar to FIG. 3, with the battery cover partially detached from the main cover.

Referring to FIG. 3, FIG. 4 and FIG. 5, when assembling the battery cover assembly 100, the two springs 20 are assembled within the two guiding slots 37 respectively. The hook portion 23 of one end of each spring 20 is engaged in the corresponding latch hole 3652 of the clamping portions 365. The battery cover 30 is slidably assembled to the back cover 10, with the two rails 33 of the battery cover 30 slidably engaging with the two chutes 16 of the back cover 10 respectively. The battery cover 30 is then pushed toward the second sidewall 152 to make the anti-detaching portion 34 displace and pass the corresponding separation-preventing portion 17 within the chute 16, to prevent the battery cover 30 from separating from the back cover 10. The hook portion 23 at the other ends of the springs 20 engages with the assembling portion 19 of the back cover 10. The battery cover 30 is further pushed until the latch block 35 latches with the latch slot 182 of the latch portion 18 of the back cover 10. The closed board 32 of the battery 30 resists against the stepped resisting portion 1545 of the fourth sidewall 154 and the spring 20 is elastically stretched.

To unlock the battery cover 30 to replace the battery, the pressing portion 39 is pressed to release the latch block 35 from the latch slot 182. The spring 20 rebounds, causing the battery cover 30 to slide toward the opening portion 1542 of the back cover 10. The anti-detaching portions 34 of the rails 33 of the battery cover 30 resist against the corresponding separation-preventing portions 17 of the chutes 16 of the back cover 10 respectively to prevent the battery cover 30 from completely separating from the back cover 10.

It is understood that the number of the elastic devices 20 is not limited to two and can be increased or decreased as needed.

It is also understood that the elastic device 20 is not limited to being a helical spring, and may be a compression spring, a plate spring or other elastic body.

It is also understood that the number of the guiding slots 37 is not limited to two and can be increased or decreased as needed.

It is also understood that the guiding slots 37 also can be a slot recessed in the inner surface 312 of the top board 31.

It is also understood that the number of the chutes 16 is not limited to two and can be increased or decreased as needed.

It is also understood that the number of the separation-preventing portions 17 is not limited to two and can be increased or decreased as needed. The number of the anti-detaching portions 34 is also not limited to two, and may be increased or decreased corresponding to the number of the separation-preventing portions 17.

It is to be understood, however, that even though numerous characteristics and advantages of the disclosure have been set forth in the foregoing description, with details of the structure and function of the exemplary embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A battery cover assembly comprising:
    a back cover comprising a battery chamber recessed thereinto, the battery chamber comprising a first sidewall, a chute recessed on the first sidewall, and a separation-preventing portion protruding from the inside of the chute without extending out of the chute;
    a battery cover being slidably mounted on the battery chamber of the back cover and comprising a top board, a rail protruding from one sidewall of the top board and an anti-detaching portion protruding from the rail, the rail slidably assembled within the chute, the anti-detaching portion coplanar with the rail, the anti-detaching portion configured for being blocked by the separation-preventing portion to prevent the battery cover from separating from the back cover when the battery cover is slid with respect to the back cover; and
    an elastic device having two opposite ends secured to the back cover and the battery cover, the elastic device configured for providing an elastic force to open the battery cover relative to the back cover;
    wherein the top board comprises an installing portion disposed at the end of an inner surface of the top board near the anti-detaching portion; the back cover includes an rod-shaped assembling portion disposed thereon near the separation-preventing portion end; the two opposite ends of the elastic device are secured to the installing portion of the battery cover and the assembling portion of the back cover respectively.

2. The battery cover assembly as claimed in claim 1, wherein the battery chamber includes a second sidewall, a third sidewall parallel to the first sidewall and a fourth sidewall parallel to the second sidewall.

3. The battery cover assembly as claimed in claim 2, wherein the back cover includes a first surface and an opposite second surface, the battery cover further includes a closed board extending from one end of the top board and perpendicular thereto; the fourth sidewall defines an opening portion that communicating with the first surface and, there forms a stepped resisting portion latching with the closed board.

4. The battery cover assembly as claimed in claim 3, wherein back cover further includes a latch portion protruding from the second sidewall toward the fourth sidewall, the latch portion includes a latch slot recessed thereon toward the first surface side; the battery cover further includes a latch block disposed at the end of the inner surface of the top board opposite to the closed board and configured for latching with the latch portion of the back cover.

5. The battery cover assembly as claimed in claim 4, wherein the battery cover further includes a guiding slot and a pressing portion, the guiding slot is disposed on the inner surface of the top board parallel to the sidewall to accommodate the elastic device; the pressing portion protrudes from the outer surface of the top board and configured for releasing the battery cover.

6. The battery cover assembly as claimed in claim 5, wherein the assembling portion protrudes from the first sidewall toward the third sidewall and connects with the third sidewall near the fourth sidewall end of the back cover; the installing portion is disposed at the end of the inner surface of the top board near the latch block and includes a base and a clamping portion protruding from the base toward the closed board, the clamping portion defines a latch hole therethrough that configured for latching with the elastic device.

7. The battery cover assembly as claimed in claim 6, wherein the guiding slot is formed by two spaced-apart protrusions protruding from the inner surface of the top board to accommodate the elastic device therebetween; the distance between the two protrusions being substantially the same as the cross section dimension of the elastic device.

8. A battery cover assembly comprising:
- a back cover comprising a battery chamber recessed thereinto, the battery chamber comprising a first sidewall, a chute recessed on the first sidewall, and a separation-preventing portion protruding from the inside of the chute without extending out of the chute;
- a battery cover being slidably mounted on the battery chamber of the back cover and comprising an anti-detaching portion protruding therefrom and a top board, the anti-detaching portion configured for being blocked by the separation-preventing portion to prevent the battery cover from separating from the back cover when the battery cover is slid with respect to the back cover; a rail protruding from one sidewall of the top board, the anti-detaching portion protrudes from the rail, the rail is slidably assembled within the chute; and
- an elastic device having two opposite ends secured to the back cover and the battery cover, the elastic device configured for providing an elastic force to open the battery cover relative to the back cover;
- wherein the top board comprises an installing portion disposed at the end of an inner surface of the top board near the anti-detaching portion; the back cover comprises a rod-shaped assembling portion disposed thereon near the separation-preventing portion end; the two opposite ends of the elastic device are secured to the installing portion of the battery cover and the assembling portion of the back cover respectively.

\* \* \* \* \*